United States Patent [19]

Kozar

[11] Patent Number: 4,613,120

[45] Date of Patent: Sep. 23, 1986

[54] D-CLAMP VISE

[76] Inventor: John J. Kozar, 5th & 11th, New Kensington, Pa. 15068

[21] Appl. No.: 738,673

[22] Filed: May 28, 1985

[51] Int. Cl.[4] .................... B23Q 1/04

[52] U.S. Cl. .................... 269/71; 269/76; 269/152; 269/249; 269/282; 269/283

[58] Field of Search .................... 269/249, 279-284, 269/152, 71, 76, 63-64, 246

[56] References Cited

U.S. PATENT DOCUMENTS

| | | | |
|---|---|---|---|
| 1,163,145 | 12/1915 | Gross | 269/283 |
| 1,766,230 | 6/1930 | Sea | 269/152 |
| 1,781,997 | 11/1930 | Berezowski | 269/280 |
| 2,669,958 | 2/1954 | Sweeney | 269/76 |
| 3,334,405 | 8/1967 | Cann et al. | 269/249 |
| 3,767,183 | 10/1973 | Gelder | 269/283 |

*Primary Examiner*—Robert C. Watson
*Attorney, Agent, or Firm*—Harvey B. Jacobson

[57] ABSTRACT

A multipurpose workpiece holding device comprises a channel shaped frame adjustably mounted on a tilting and swiveling base. The frame has vertical slots on opposite sides thereof for adjustably receiving a lead screw on one side of the frame and a jaw forming element on the other side of the frame. The lead screw has a headed end for use as a clamp in conjunction with a concave jaw-forming element in the oppositely disposed slot and the device is also provided with an attachable and detachable vise jaw for the clamp element on the lead screw and a further vise jaw for use in place of the concave jaw element so that ready conversion as between a vise or clamp can be effected. Both single-jaw and double-jaw workpiece holding devices are disclosed.

14 Claims, 8 Drawing Figures

D-CLAMP VISE

BACKGROUND OF THE INVENTION

This invention relates to a versatile form of workpiece holding device which can be used as a clamp or a vise and which has replaceable jaw elements for ready conversion of the device as between a gripping tool for circular section workpieces and a gripping tool for flat workpieces.

It is an object of the invention to provide a workpiece holding device which can be used for diverse gripping operations either in a workshop, in situ in a field situation, or in the home.

Another object of the invention is to provide a workpiece holding device which can easily be converted either to grip flat or round objects, without the need for specialized tools.

A further object of the invention is to provide a workpiece holding device having tilt and swivel adjustments allowing the attitude of the device to be adjusted in order to suit different operations.

Yet another object of the invention is to provide a workpiece holding device with movably adjustable jaws.

Still a further and more generalized object of the invention is to provide a convenient multipurpose workpiece holder which forms a useful workshop adjunct.

DISCLOSURE STATEMENT

Applicant is aware of the following U.S. patents pertaining to workpiece holding devices and the like.

U.S. Pat. No. 1,517,308, C. W. Morgan, 12-2-24
U.S. Pat. No. 1,904,798, J. S. Nurnberger, 4-18-33
U.S. Pat. No. 2,535,450, C. E. O'Malley, 12-26-50
U.S. Pat. No. 2,679,178, E. A. Odin, 5-25-54
U.S. Pat. No. 2,734,409, R. H. Schum et al., 2-14-56
U.S. Pat. No. 3,341,190, M. L. Adamson, 9-12-67
U.S. Pat. No. 3,835,594, Szulman, 9-17-74.

The patent to Morgan shows a vise having a lead screw which can slide along a support arm. Patents to Szulman, O'Malley and Odin show vise structures with multiple jaws. The remaining patents show vise structures with replaceable jaw members. None of the patents, however, discloses a workpiece holding device having the features of the present invention.

SUMMARY OF THE INVENTION

Broadly stated, a workpiece holding device in accordance with the invention is developed around a frame of generally channel-like section with oppositely disposed web segments defining slots therebetween in a direction extending from the base of the channel section to the free edges of the web segments. A slot on one side of the frame is adapted to receive a first slide fitting with an associated lead screw having an inner end defining a clamping member, and a slot on the other side of the frame is adapted to receive a second slide fitting with an associated jaw-forming member. The second slide fitting may have a clamp for releasably clamping same in selected position along its respective slot, but the first slide fitting may be a floating fitting, the first slide member being effectively clamped in position when the lead screw is tightened to grip a workpiece against the jaw member.

Alternative second slide members may be provided for providing jaw members suitable respectively for flat or curved workpieces. The clamping member on the lead screw may be formed as a headed end and a removable jaw element may be provided to fit on the headed end for use as a vise jaw.

The slotted channel web sections may be provided singly or in pairs on the frame to provide a single or double vise/clamp arrangement, and the frame as a whole may be mounted on a swiveling and tilting base.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
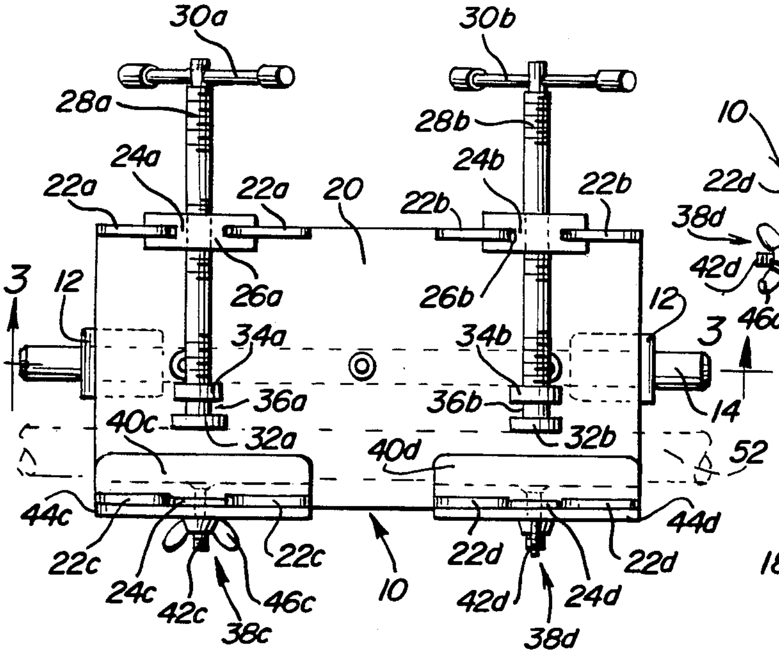
FIG. 1 is a plan view of a two-jaw workpiece holding device in accordance with the invention.
Figure 2:
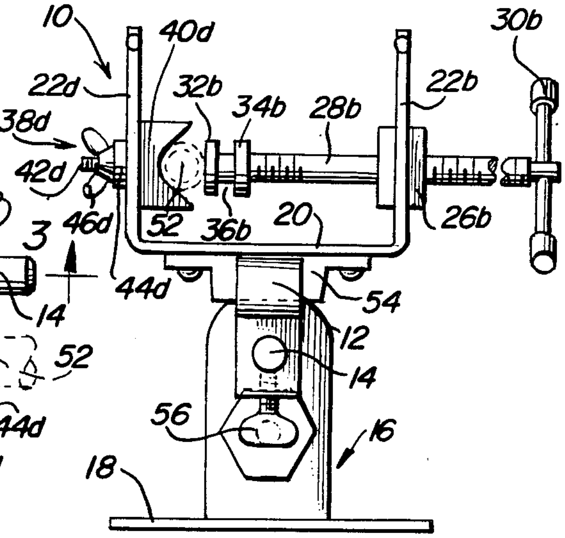
FIG. 2 is an end elevational view of the device.
Figure 3:
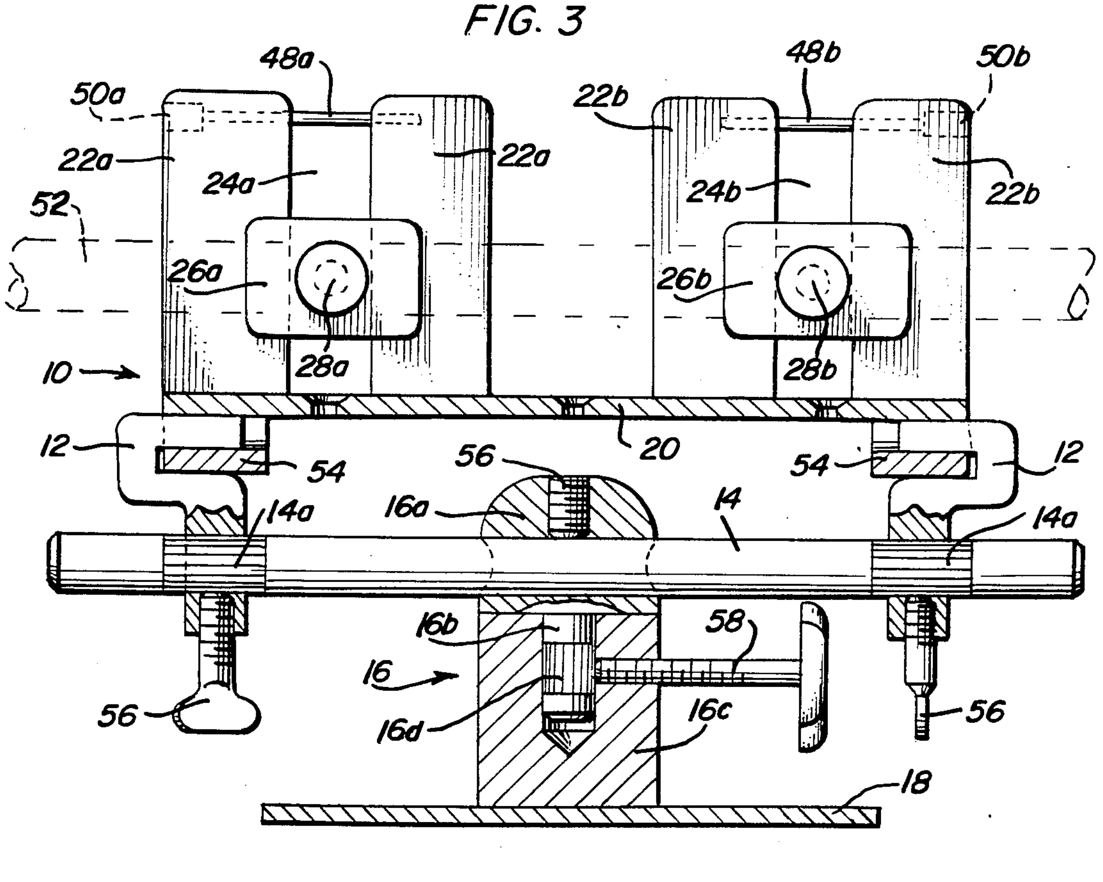
FIG. 3 is an enlarged sectional view on line 3—3 of FIG. 1.

Referring initially to FIGS. 1 to 3, there is illustrated a double-jaw workpiece holding device generally comprising a frame 10 mounted by clamps 12 on a horizontal tilt bar 14 itself carried in a swivel-type post 16 on a base plate 18. The base plate may have holes (not shown) whereby it may be secured on a work surface.

Frame 10 is of generally channel-section plate or the like having a base portion 20, upright pairs of web segments **22*a*, 22*b* on one side of the base, and upright pairs of like web segments 22*c*, 22*d* on the other side of the base portion. The respective pairs of segments define respective slots 24*a*, 24*b*, 24*c* and 24*d*** therebetween.

Mounted for free sliding up and down movement in the respective slots **24*a*, 24*b* are respective first slide fittings 26*a*, 26*b*, which are H-shaped in plan so as to embrace the respective web segments as shown in FIG. 1. Slide fittings 26*a* and 26*b* are each centrally tapped to receive respective lead screws 28*a*, 28*b* threaded therethrough. The lead screws have operating handles 30*a*, 30*b* at their outer ends, and headed clamp elements 32*a*, 32*b* at their inner ends. Collars 34*a* and 34*b* are provided on the lead screws adjacent the clamp elements with annular grooves 36*a*, 36*b*** defined therebetween.

Figure 7:
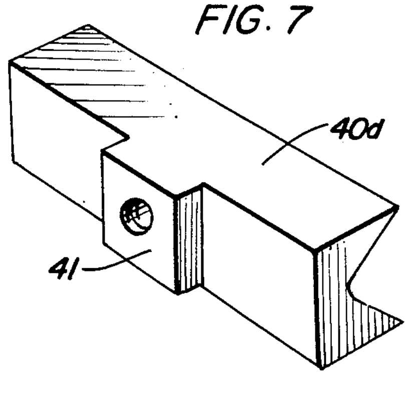
FIG. 7 is a perspective view of an alternative type of jaw forming member for use in the device.

Similarly mounted for sliding movement up and down the respective slots **24*c*, 24*d* are respective second slide fittings 38*c*, 38*d*. Each of the second slide fittings comprises a respective concave jaw member 40*c*, 40*d* (which may each have a tongue 41 fitting in the respective slot, see FIG. 7) a screw 42*c*, 42*d*, extending outwardly from the jaw member, a clamp plate, 44*c*, 44*d* on the respective screw for engaging the outside surfaces of the respective web segments, and a wing nut 46*c*, 46*d* on the respective screw. It will be readily understood that the respective jaw members 40*c*, 40*d* can be adjustably moved along slots 24c, 24d to a selected position and releasably clamped in place by the respective wing nuts 46c, 46d**.

In order to retain the respective slide fittings in the respective slots, removable pins 48a, 48b, 48c, 48d may be provided, the pins fitting in suitable holes drilled in the respective web segments adjacent their free ends, and being retained in place by respective screws 50a, 50b, 50c, 50d. Removal of the screws permits removal of the pins and hence removal of the slide fittings from the respective slots.

As shown in FIGS. 1 to 3, the device as set up therein can be used as a clamp for holding an elongate tubular or like workpiece 52 between the respective jaw members 40c, 40d and the respective clamp elements 32a, 32b, by suitably locating and clamping the jaw members in their respective slots and tightening down the lead screws.

However, the device can also be used, for example, as a vise by replacing the clamping jaw members, 40c, 40d with respective vise jaw members, to be described in connection with FIGS. 4 to 8, and fitting complimentary vise jaw members, also to be described in connection with FIGS. 4 to 8, on the clamp elements 32a, 32b.

Clamps 12 fit in pockets defined by plates 54 on the bottom of frame 10 the clamps having thumb screws 56 whereby frame 10 can be clamped in a selected position of tilt on bar 14. The bar has serrated of flattened portions 14a on which the clamps 12 fit to provide index-type tilting of the frame. Bar 14 is clamped in post 16 at its center by a screw 56. The post has a top portion 16a with a depending pin 16b which fits the bottom portion 16c of the post. The pin has serrations or flats 16d engaged by a screw 58, so that the frame 10 can be swiveled or indexed about a vertical axis and releasably clamped in a selected position.

Figure 4:
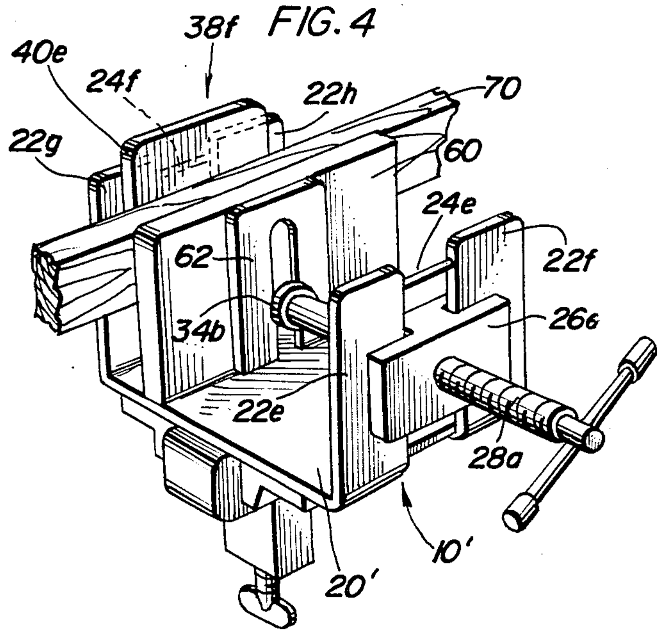
FIG. 4 is a perspective view of a single-jaw workpiece holding device in accordance with the invention.
Figure 5:
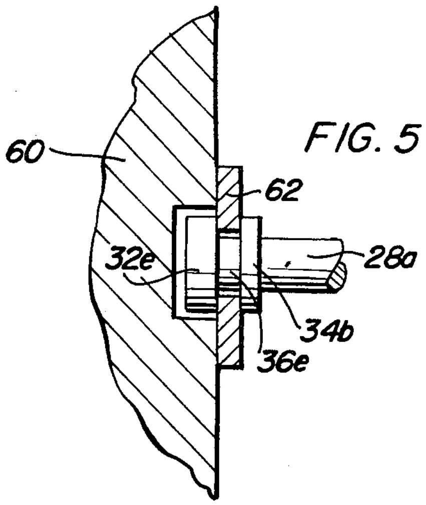
FIG. 5 is an enlarged sectional view of part of the device shown in FIG. 4.
Figure 6:
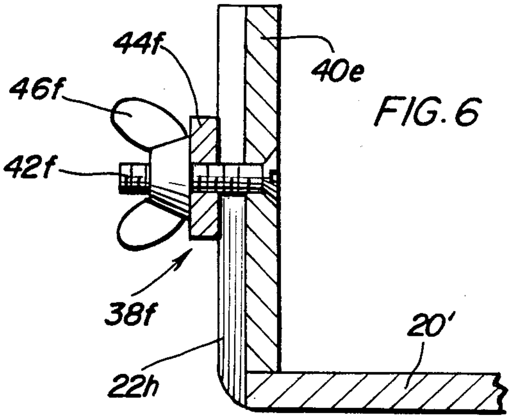
FIG. 6 is an enlarged sectional view of another part of the device.

FIGS. 4 to 8 show a single-jaw workpiece holding device of similar overall concept and design to the two-jaw device of FIGS. 1 to 3. Thus, the single-jaw device comprises a channel-section frame 10', with a base 20', and pairs of web segments 22e, 22f, 22g, 22h, extending therefrom and defining respective slots 24e, 24f therebetween. A first slide fitting 26e (like fitting 26a) is received in slot 24e and carries a like lead screw 28a. In this case, however, the headed end 32e of the lead screw has a flat vise jaw element 60 releasably attached thereto by means of a slotted plate 62 in back of element 60 which slides into groove 36e of the lead screw, as best seen in FIG. 5. Also, the second slide fitting 38f in this case comprises a complimentary flat vice jaw member 40e in place of the concave jaw member of the first embodiment. The rest of structure 38f is substantially similar to that previously described.

Figure 8:
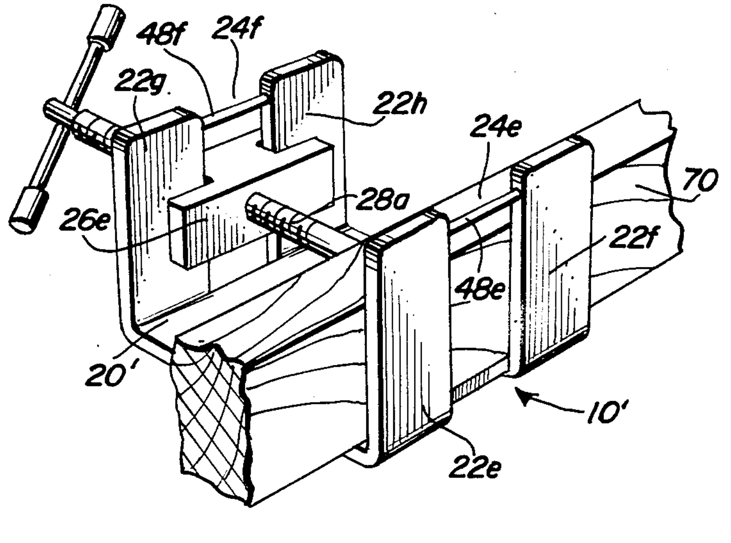
FIG. 8 is a perspective view of the device shown in FIG. 4 showing an alternative mode of use.

It will be seen that the device as set up in FIG. 4 can be used as a vise to clamp flat articles such as a wood strip 70. Further, it is understood that flat vise-type jaw members as described in connection with FIGS. 4 to 7 can also be provided for the device shown in FIGS. 1 to 3, and likewise, a concave jaw element may be provided for the device shown in FIGS. 4 to 7. FIG. 8 shows how the device can be used to clamp an elongate wood strip without using the second slide fitting, and using only the lead screw to clamp the strip against the opposite web segments. In an alternative arrangement, a pair of lead screw fittings can be used on opposite sides of the frame to provide a pair of threaded adjustable jaws.

Preferably, the working parts of the device are plated with copper or the like to provide a hard wearing finish resistant to abrasion, welding spatter, and the like.

It will be appreciated from the foregoing that the invention provides a versatile and adaptable workpiece holding device which can be used for a multitude of purposes and readily converted to the particular use in hand.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A workpiece holding device comprising a channel-section frame having a base portion and pairs of web segments extending from opposite sides of the base portion, the respective pairs of web segments each defining a slot therebetween extending direction-wise from toward the base portion to toward the free ends of the respective segments, a first slide fitting for floating receipt in the slot between a pair of web segments on one side of the base portion, the first slide fitting carrying a lead screw threaded therethrough, the lead screw having an inner end formed with a clamp member for clamping against a workpiece located adjacent the web segments on the other side of the base portion responsive to tightening of the lead screw, and a second slide fitting for sliding receipt in the slot between the web segments on the other side of the base portion, the second slide fitting comprising a jaw member and means for releasably clamping the jaw member in selected position along the slot.

2. The invention of claim 1 wherein the clamping means for the jaw member comprises a screw for extending from the jaw member through the respective slot, a clamp plate for receipt on the screw to clamp against outer surfaces of the respective web segments, and a nut for threading on the screw against the clamp plate.

3. The invention of claim 2 wherein the jaw member has a jaw surface which is one of a flat and concave surface.

4. The invention of claim 3 further including another jaw member for use in place of the jaw member aforesaid, the other jaw member having a jaw surface which is the other of a flat and concave surface.

5. The invention of claim 1 further including a jaw element for fitting on the clamp member of the lead screw to form a vise jaw.

6. The invention of claim 5 wherein the lead screw includes a collar adjacent the clamp member, the clamp member and collar defining an annular groove therebetween, and wherein the jaw element includes a slotted plate for fitting in the groove so as to releasably attach the jaw element to the lead screw.

7. The invention of claim 1 wherein the web segments and slide fitting are replicated side by side on the base portion of the frame to form a double-jaw holding device.

8. The invention of claim 1 further including removable means for precluding removal of the first and second slide fittings from their respective slots.

9. The invention of claim 8 wherein the removable means comprises pins fitting in holes formed in the respective web segments adjacent the free ends thereof so as to span the respective slots.

10. The invention of claim 1 including a base means formed with a tilt rod, bearing means mounting the frame on the rod, and releasable clamp means for holding the frame in a selected position of tilt on the rod.

11. The invention of claim 10 wherein the base includes swivel means for adjustably retaining the frame in a selected swivel position about an axis generally perpendicular to the rod.

12. A workpiece holding device comprising a frame of generally channel-shaped cross section having a base portion, and pairs of web segments on opposite sides of the base portion defining respective slots therebetween, a first slide fitting for floating receipt in the slot between a pair of the segments on one side of the frame, the first slide fitting having a lead screw threaded therethrough with a clamp element at an inner end of the lead screw, a first jaw-forming element for releasable receipt on the clamp element to form a first vise jaw, a second slide fitting for sliding receipt in the slot between a pair of web segments on the other side of the base portion, the second slide fitting including a second jaw element, clamping means for releasably retaining the second slide fitting in selected position in the respective slot whereby the device can be used as a vise or clamp by selective use of the first slide fitting with and without the first jaw forming element, and base means for the frame.

13. The invention of claim 12 wherein the second jaw element has a flat clamping surface and the device further includes a further jaw element with a concave clamping surface for use in place of the second jaw element.

14. The invention of claim 12 wherein the base means includes mutually perpendicular swivel and tilt adjustment means for the frame.

* * * * *